(12) United States Patent
Cao

(10) Patent No.: US 6,567,581 B2
(45) Date of Patent: May 20, 2003

(54) FIBER OPTIC DENSE WAVELENGTH DIVISION MULTIPLEXER UTILIZING A MULTI-STAGE PARALLEL CASCADE METHOD OF WAVELENGTH SEPARATION

(75) Inventor: Simon X. F. Cao, San Mateo, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/881,274

(22) Filed: Jun. 14, 2001

(65) Prior Publication Data

US 2002/0012494 A1 Jan. 31, 2002

Related U.S. Application Data

(63) Continuation of application No. 09/130,386, filed on Aug. 6, 1998, now Pat. No. 6,263,126.

(51) Int. Cl.[7] .................................................. G02B 6/28
(52) U.S. Cl. ............................ 385/24; 385/46; 385/131
(58) Field of Search ............................... 385/24, 33, 45, 385/46, 36; 359/131

(56) References Cited

U.S. PATENT DOCUMENTS 5,233,453 A * 8/1993 Sivarajan et al. ........... 359/117
6,304,706 B1 * 10/2001 Sugita et al. ................ 385/129

* cited by examiner

Primary Examiner—Hung N. Ngo
(74) Attorney, Agent, or Firm—Sawyer Law Group LLP

(57) ABSTRACT

An improved dense wavelength division multiplexer for the separation of optical channels is provided. The dense wavelength division multiplexer includes the inputting of an optical signal with the optical signal containing a plurality of optical channels; the separating of one or more of the plurality of optical channels from the optical signal using separators at least partly arranged in a multi-stage parallel cascade configuration; and the outputting of the separated plurality of channels along a plurality of optical paths. The dense wavelength division multiplexer of the present invention provides for a lower insertion loss by requiring an optical signal to travel through fewer optical components in the separation process.

54 Claims, 13 Drawing Sheets

US 6,567,581 B2

FIBER OPTIC DENSE WAVELENGTH DIVISION MULTIPLEXER UTILIZING A MULTI-STAGE PARALLEL CASCADE METHOD OF WAVELENGTH SEPARATION

CROSS-REFERENCE TO RELATED APPLICATIONS

This application is a Continuation of U.S. patent application Ser. No. 09/130,386, entitled "Fiber Optic Dense Wavelength Division Multiplexer Utilizing a Multi-Stage Parallel Cascade Method of Wavelength Separation," filed on Aug. 6, 1998 now U.S. Pat. No. 6,263,126.

FIELD OF THE INVENTION

The present invention relates to fiber optic networks, and more particularly to fiber optic dense wavelength division multiplexers.

BACKGROUND OF THE INVENTION

Fiber optic networks are becoming increasingly popular for data transmission due to their high speed, high capacity capabilities. Multiple wavelengths may be transmitted along the same optic fiber. These wavelengths are combined to provide a single transmitted signal. A crucial feature of a fiber optic network is the separation of the optical signal into its component wavelengths, or "channels", typically by a dense wavelength division multiplexer. This separation must occur in order for the exchange of wavelengths between signals on "loops" within networks to occur. The exchange occurs at connector points, or points where two or more loops intersect for the purpose of exchanging wavelengths.

Add/drop systems exist at the connector points for the management of the channel exchanges. The exchanging of data signals involves the exchanging of matching wavelengths from two different loops within an optical network. In other words, each signal drops a channel to the other loop while simultaneously adding the matching channel from the other loop.

FIG. 1 illustrates a simplified optical network 100. A fiber optic network 100 could comprise a main loop 150 which connects primary locations, such as San Francisco and New York. In-between the primary locations is a local loop 110 which connect with loop 150 at connector point 140. Thus, if local loop 110 is Sacramento, wavelengths at San Francisco are multiplexed into an optical signal which will travel from San Francisco, add and drop channels with Sacramento's signal at connector point 140, and the new signal will travel forward to New York. Within loop 110, optical signals would be transmitted to various locations within its loop, servicing the Sacramento area. Local receivers (not shown) would reside at various points within the local loop 110 to convert the optical signals into the electrical signals in the appropriate protocol format.

The separation of an optical signal into its component channels are typically performed by a dense wavelength division multiplexer. FIG. 2 illustrates add/drop systems 200 and 210 with dense wavelength division multiplexers 220 and 230. An optical signal from Loop 110 ($\lambda_1$–$\lambda_n$) enters its add/drop system 200 at node A (240). The signal is separated into its component channels by the dense wavelength division multiplexer 220. Each channel is then outputted to its own path 250-1 through 250-n. For example, $\lambda_1$ would travel along path 250-1, $\lambda_2$ would travel along path 250-2, etc. In the same manner, the signal from Loop 150 ($\lambda_1'$–$\lambda_n'$) enters its add/drop system 210 via node C (270). The signal is separated into its component channels by the wavelength division multiplexer 230. Each channel is then outputted via its own path 280-1 through 280-n. For example, $\lambda_1'$ would travel along path 280-1, $\lambda_2'$ would travel along path 280-2, etc.

In the performance of an add/drop function, for example, $\lambda_1$ is transferred to path 280-1. It is combined with the others of Loop 150's channels into a single new optical signal by the dense wavelength division multiplexer 230. The new signal is then returned to Loop 150 via node D (290). At the same time, $\lambda_1'$ is transferred to path 250-1 from 280-1. It is combined with the others of Loop 110's channels into a single optical signal by the dense wavelength division multiplexer 220. This new signal is then returned to Loop 110 via node B (260). In this manner, from Loop 110's point of view, channel $\lambda_1$ of its own signal is dropped to Loop 150 while channel $\lambda_1'$ of the signal from Loop 150 is added to form part of its new signal. The opposite is true from Loop 150's point of view. This is the add/drop function.

Conventional methods used by dense wavelength division multiplexers in separating an optical signal into its component channels includes the use of filters and fiber gratings as separators. A "separator," as the term is used in this specification, is a unit of optical components which separates one or more channels from an optical signal. Filters allow a target channel to pass through while redirecting all other channels. Fiber gratings target a channel to be reflected while all other channels pass through. Both filters and fiber gratings are well known in the art and will not be discussed in further detail here. FIG. 3 illustrates a conventional multi-stage serial cascade configuration of separators in a dense wavelength division multiplexer 300. In this conventional method, each separator targets only one channel to be filtered/reflected and sent along a path. For example, an optical signal containing channels $\lambda_1$–$\lambda_n$ is inputted into separator 310A, which filters/reflects channel $\lambda_1$ and send it along its own path 320-1. The remaining channels $\lambda_2$–$\lambda_n$ are sent to the next separator 310B, which filters/reflects channel 2 and sends it along its own path 320-2. This continues until each channel has been filtered/reflected and sent along its own path. Thus, with this method, for N channels there are N separators.

FIG. 4 illustrates a conventional single stage parallel configuration of separators in a dense wavelength division multiplexer 400. In this conventional method, the original optical signal containing $\lambda_1$–$\lambda_n$ enters a signal splitter 410 which splits the signal onto N separate paths, each split signal containing channels $\lambda_1$–$\lambda_n$. Each of these split signals is sent along a separate path 420-1 through 420-n. Each signal is then filtered or reflected by the separators 430A–430N to output one particular channel. For example, a split signal containing channels $\lambda_1$–$\lambda_n$ exits the splitter 410 onto path 420-1. The split signal enters separator 430A which filters/reflects channel $\lambda_1$ and sends it along path 420-1. Another split signal containing $\lambda_1$–$\lambda_n$ exits splitter 410 onto path 420-2 and enters separator 430B. Separator 430B filters/reflects channel $\lambda_2$ and sends it along path 420-2. This process repeats to separate each channel. Thus for N channels, there must be N separators plus a signal splitter.

A problem with the conventional configurations of separators above is the resulting high insertion loss. Insertion loss is the attenuation of an optical signal caused by the insertion of an optical component, such as a connector, coupler, or filter. For the multi-stage serial cascade configuration illustrated in FIG. 3, each time the optical signal goes through a separator 310A–310N an amount of insertion loss results. For example, if the optical signal in FIG. 3 has eight channels $\lambda_1$–$\lambda_8$ and each component causes 1 dB of insertion loss. By the time $\lambda_8$ is separated, it would have passed through eight separators. As would thus suffer 8 dB of insertion loss.

The same problem exists for the single stage parallel configuration in FIG. 4. Assume again that the optical signal contains eight channels and each component causes 1 dB of insertion loss. In splitting one signal onto eight paths, a 9 dB insert loss results. Another 1 dB of loss is added by the separator 430A–430N. Thus, each channel suffers 10 dB of insertion loss.

Therefore, there exists a need for a dense wavelength division multiplexer with a method of separation which lowers insertion loss. The present invention addresses such a need.

SUMMARY OF THE INVENTION

An improved dense wavelength division multiplexer for the separation of optical channels is provided. The dense wavelength division multiplexer includes the inputting of an optical signal with the optical signal containing a plurality of optical channels; the separating of one or more of the plurality of optical channels from the optical signal using separators at least partly arranged in a multi-stage parallel cascade configuration; and the outputting of the separated plurality of channels along a plurality of optical paths. The dense wavelength division multiplexer of the present invention provides for a lower insertion loss by requiring an optical signal to travel through fewer optical components in the separation process.

DETAILED DESCRIPTION

The present invention relates to an improvement in a dense wavelength division multiplexer. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A dense wavelength division multiplexer (DWDM) in accordance with the present invention provides for a lower insertion loss by requiring an optical signal to travel through fewer optical components. To more particularly describe the features of the present invention, please refer to FIGS. 5A through 14 in conjunction with the discussion below.

Figure 1:
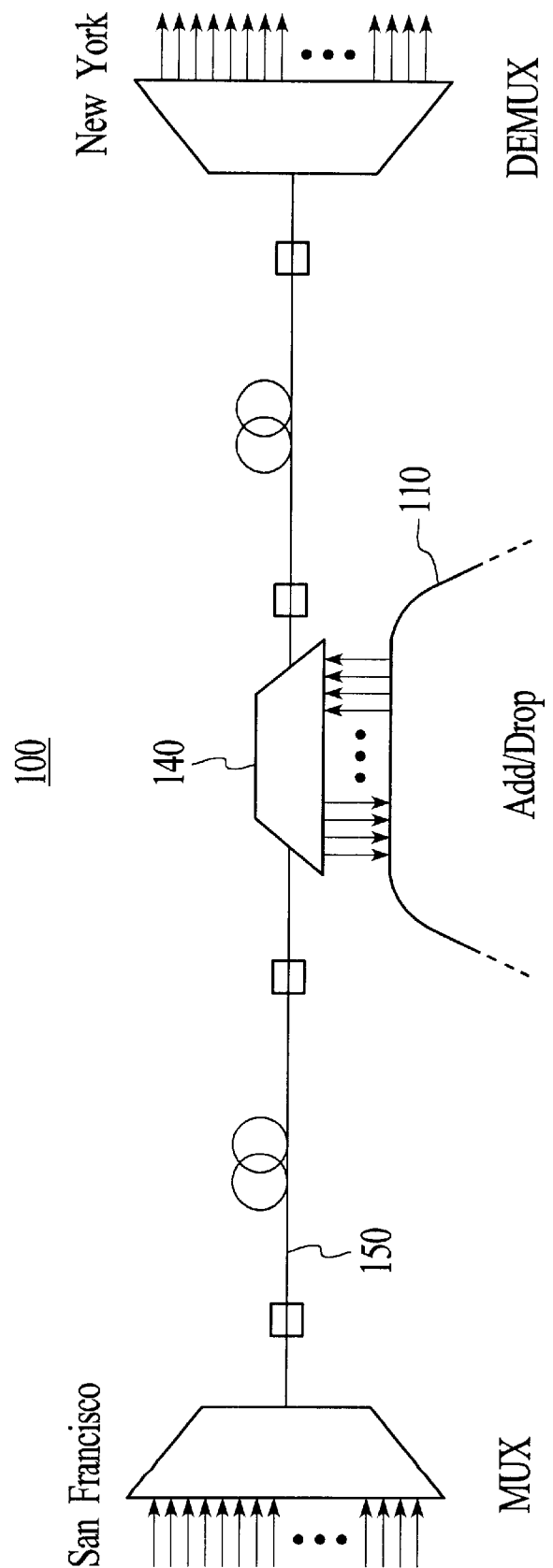
FIG. 1 is an illustration of a simplified optical network.
Figure 2:
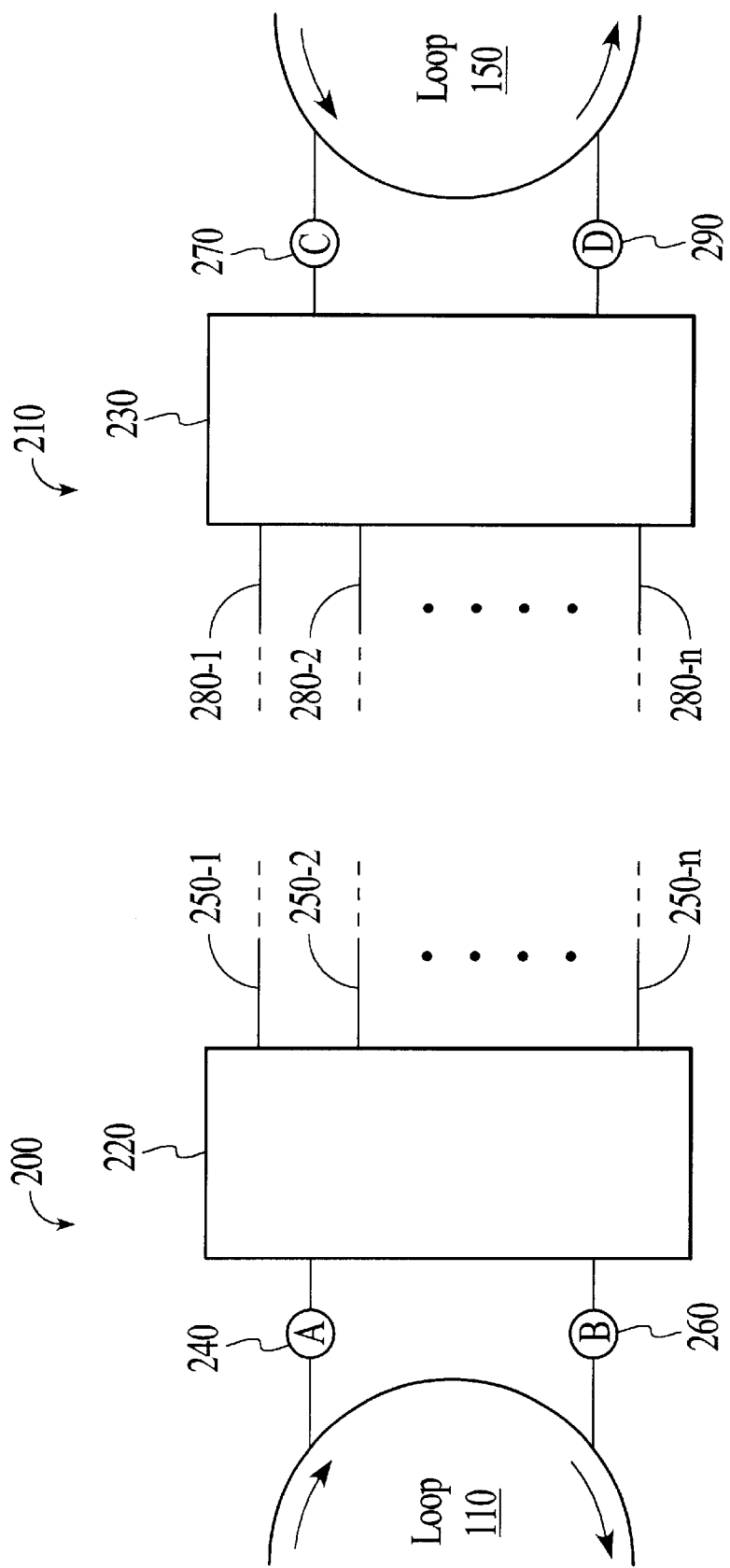
FIG. 2 is an illustration of conventional add/drop systems and dense wavelength division multiplexers.
Figure 3:
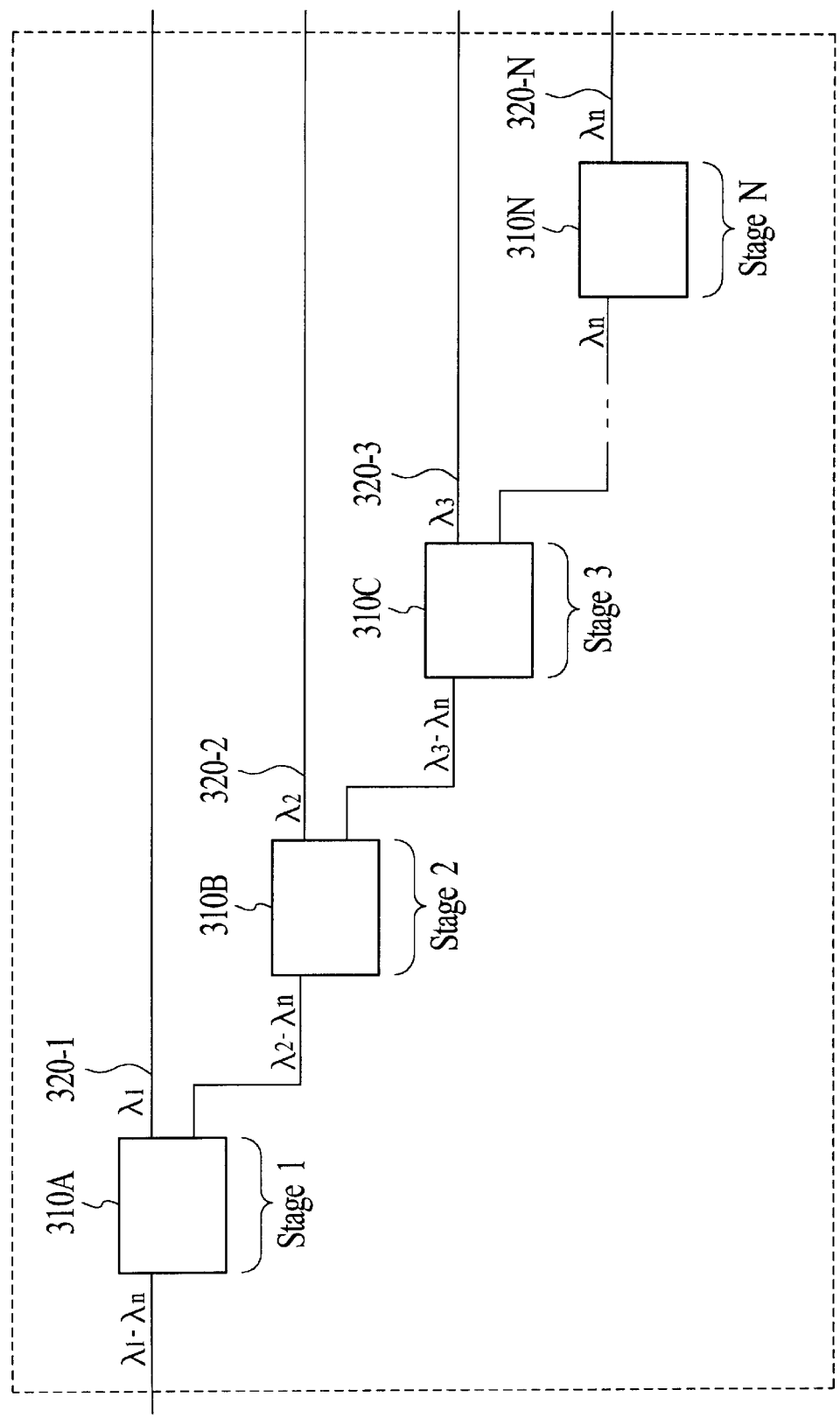
FIG. 3 is an illustration of a conventional multi-stage serial cascade configuration of separators.
Figure 4:
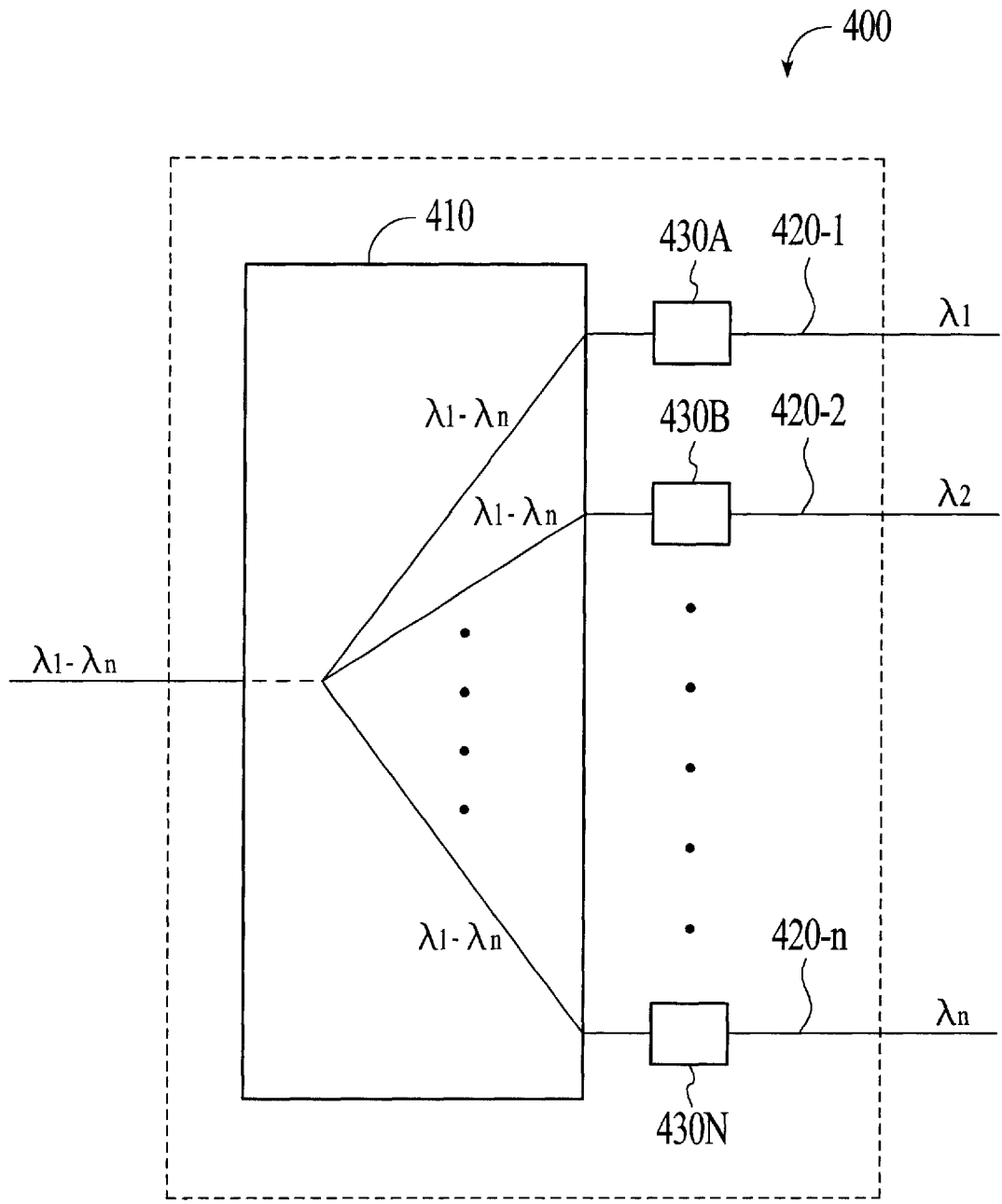
FIG. 4 is an illustration of a conventional single stage parallel configuration of separators.
Figure 5A:
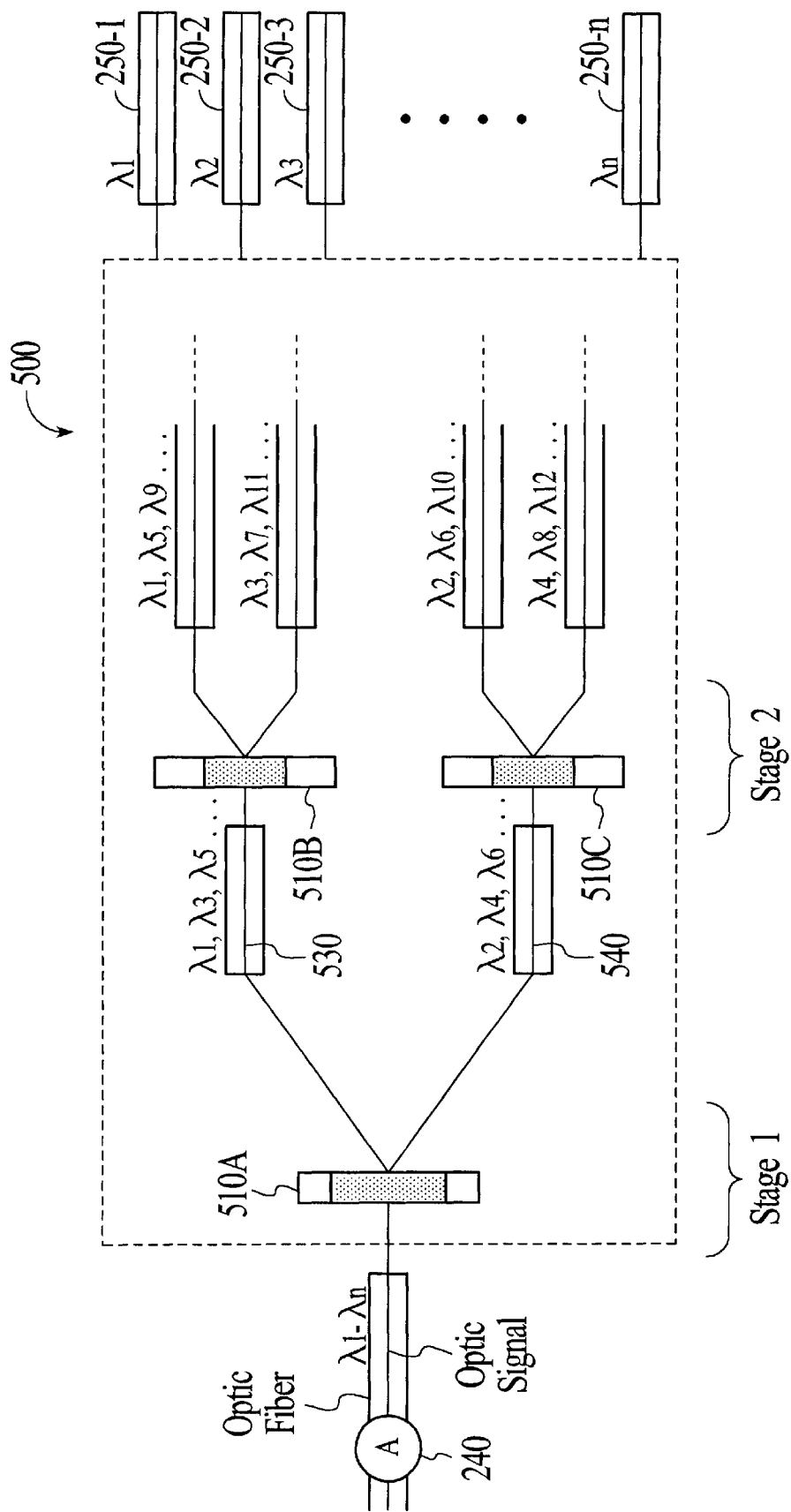
FIGS. 5A and 5B are simple block diagrams of a first preferred embodiment of a dense wavelength division multiplexer in accordance with the present invention.

FIG. 5A is a simple block diagram of a first preferred embodiment of a DWDM with a multi-stage parallel cascade configuration of separators in accordance with the present invention. An optic signal containing channels $\lambda_1$–$\lambda_n$ enters the DWDM 500 through node A (240). The signal passes through a separator 510A. The separator 510A divides the signal into two separate signals, one containing the odd channels ($\lambda_1, \lambda_3, \lambda_5, \ldots$) (530) and the other containing the even channels ($\lambda_2, \lambda_4, \lambda_6, \ldots$) (540), i.e., every other channel. These odd and even channels are each passed through another separator 510B–510C which further divides them by every other channel. This division continues until only one channel is outputted to each optic fiber, 250-1 through 250-n.

Figure 5B:
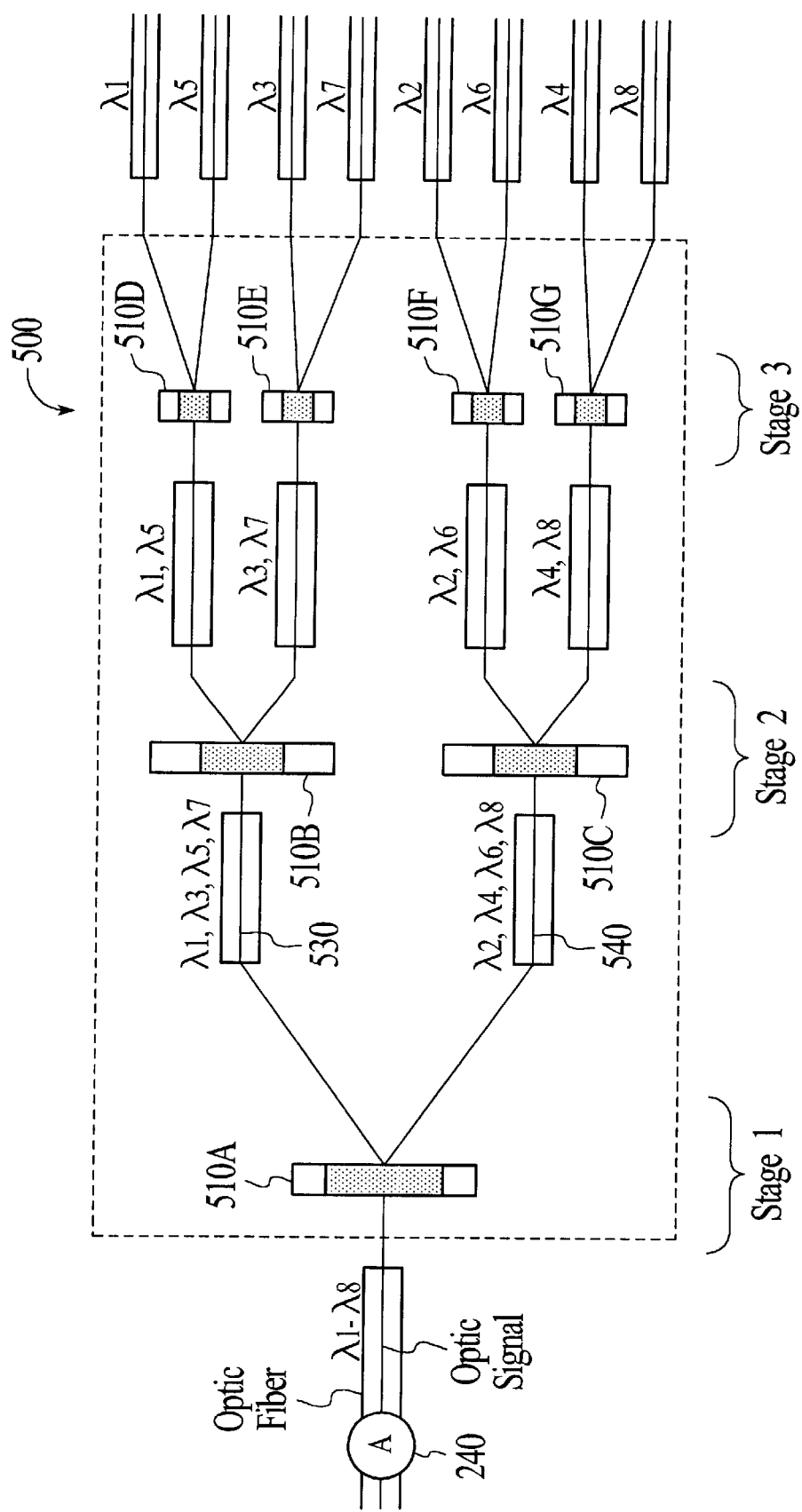

This multi-stage parallel cascade configuration of separators reduces the amount of insertion loss typically suffered with the conventional configurations because it reduces the number of components through which an optical signal must travel. For example, as illustrated in FIG. 5B, if an optical signal contains eight wavelengths $\lambda_1$–$\lambda_8$, only seven separators 510A–510G are used. Assume that each separator causes 1 dB of insertion loss. Since each channel only goes through three separators, they only suffer 3 dB of insertion loss, much less than the 8 dB and 10 dB of the conventional multi-stage serial and single stage parallel configurations respectively. The relationship between the number of stage M and the number of separators N for the DWDM 500 of the present invention is $N=2^M$. M is much smaller than N, thus the DWDM 500 of the present invention has lower insertion loss than both conventional configurations.

Figure 6:
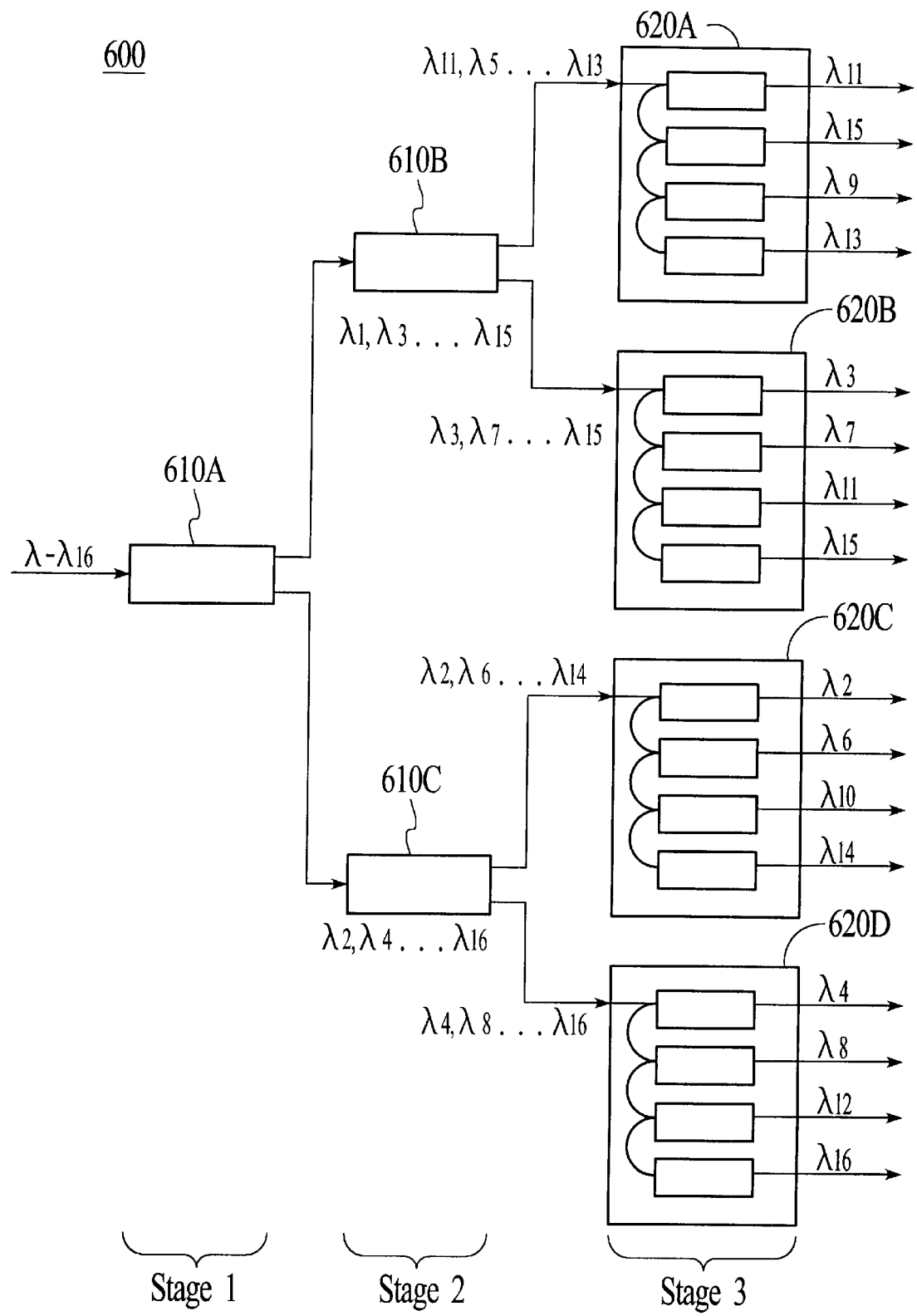
FIG. 6 is an illustration of a second preferred embodiment of a dense wavelength division multiplexer in accordance with the present invention.

FIG. 6 illustrates a second preferred embodiment of a DWDM in accordance with the present invention. This DWDM 600 has a hybrid parallel-serial cascade configuration. Certain stages of the DWDM uses a parallel cascade configuration of separators as described in conjunction with FIGS. 5A and 5B above. Along with these parallel cascade stages are stages which use a serial cascade configuration of separators. For example, stages 1 and 2 in the DWDM 600 uses a parallel cascade configuration while stage 3 uses a serial cascade configuration. Assume that an optical signal containing channels $\lambda_1$–$\lambda_{16}$ is input into the DWDM 600. Separator 610A separates them into two signals, one containing the odd channels ($\lambda_1, \lambda_3, \ldots \lambda_{15}$), the other containing the even channels ($\lambda_2, \lambda_4, \ldots \lambda_{16}$). The odd channels are input into separator 610B which separates them further into two sets. One set of signals ($\lambda_1, \lambda_5, \ldots \lambda_{13}$) is input into separator 620A, while the other set ($\lambda_3, \lambda_7, \ldots \lambda_{15}$) is input into separator 620B. The even channels are input into separator 610C which separates them further into sets of signals. One set of signals ($\lambda_2, \lambda_6, \ldots \lambda_{14}$) is input into separator 620C, while the other set ($\lambda_4, \lambda_9, \ldots \lambda_{16}$) input into separator 620D. Separators 620A–620D are in a serial cascade configuration which filters for each individual channel and outputs each onto separate paths. By using this hybrid configuration, a user has more flexibility in deciding how many separators will be used. This can be important when costs is a particular concern to a user.

Figure 7:
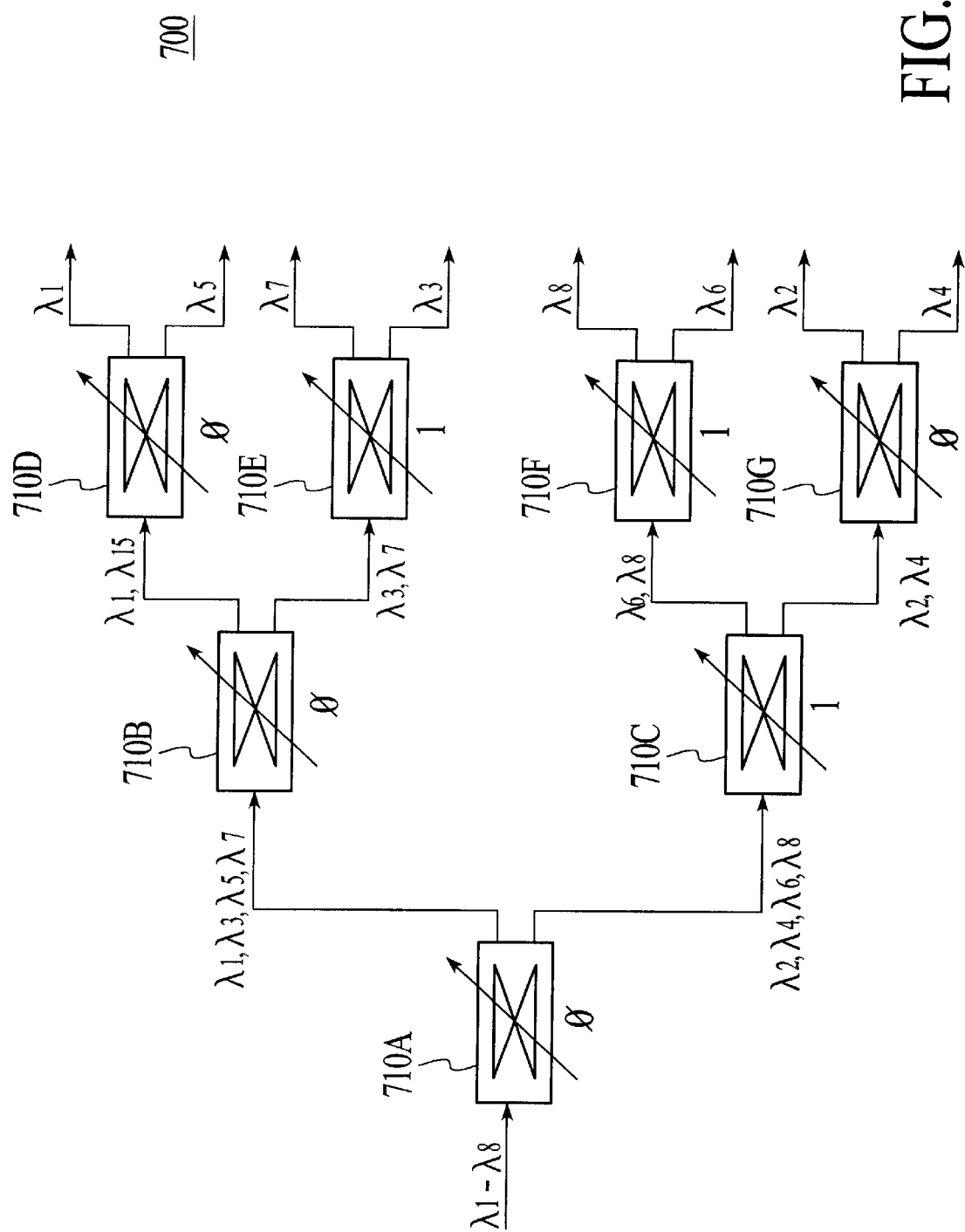
FIG. 7 is an illustration of a third preferred embodiment of a dense wavelength division multiplexer in accordance with the present invention.

FIG. 7 illustrates a third embodiment of a DWDM in accordance with the present invention. This DWDM 700 has a programmable router configuration which adds programmability to the parallel cascade configuration illustrated in FIGS. 5A and 5B. In this embodiment, the separators (710A–710G) may be programmed to route particular channels to particular paths and therefore function as 1×2 switches. For example, assume that an optical signal containing channels $\lambda_1$–$\lambda_8$ is input into the DWDM 700. Separator 710A is programmed to route the odd channels ($\lambda_1$, $\lambda_3$, $\lambda_5$, $\lambda_7$) to separator 710B and the even channels ($\lambda_2$, $\lambda_4$, $\lambda_6$, $\lambda_8$) to separator 710C, as with the embodiment illustrated in FIG. 5B. Separator 710B is programmed to route $\lambda_1$ and $\lambda_5$ to separator 710D, and $\lambda_3$ and $\lambda_7$ to separator 710E. However, separator 710C is programmed to flip the route of the wavelengths, represented by the "1", such that $\lambda_6$ and $\lambda_8$ are routed to 710F instead of 710G, and $\lambda_2$ and $\lambda_4$ are routed to 710G instead of 710F. Similarly, separators 710D and 710G are programmed not to flip the route of the wavelengths while separators 710E and 710F are, resulting in the outputs as shown. Comparing the outputs with the outputs in FIG. 5B, one can see the rerouting of $\lambda_3$, $\lambda_7$, $\lambda_2$, $\lambda_4$, and $\lambda_8$.

Figure 8:
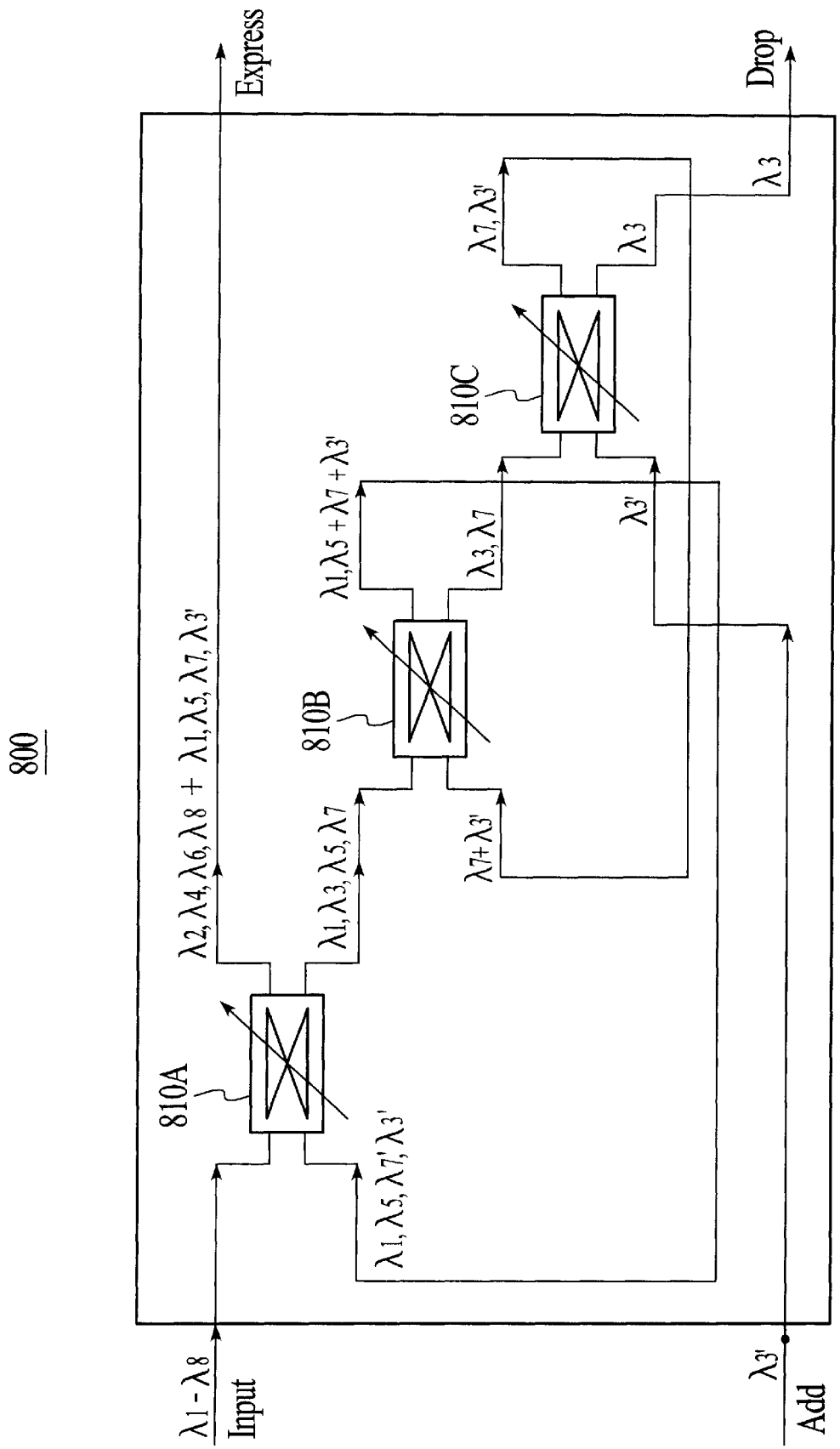
FIG. 8 is an illustration of a fourth preferred embodiment of a dense wavelength division multiplexer in accordance with the present invention.

FIG. 8 illustrates a fourth embodiment of a DWDM in accordance with the present invention. This DWDM 800 also contains separators which function as 2×2 switches, as with the programmable router configuration of FIG. 7. However, in this embodiment, these separators are used to perform the add/drop function. For example, assume an optical signal containing wavelengths $\lambda_1$–$\lambda_8$ in input into the DWDM 800. Separator 810A separates this signal into its odd ($\lambda_1$, $\lambda_3$, $\lambda_5$, $\lambda_7$) and even ($\lambda_2$, $\lambda_4$, $\lambda_6$, $\lambda_8$) channels. The odd channels are input into separator 810B, which further separates them into two sets of channels, ($\lambda_1$, $\lambda_5$) and ($\lambda_3$, $\lambda_7$). The ($\lambda_3$, $\lambda_7$) set of channels are input into separator 810C which separates them into separate channels $\lambda_3$ and $\lambda_7$. Channel $\lambda_3$ is then dropped. To be added is channel $\lambda_3$' which is inputted into separator 810C. Acting as a 2×2 switch as described with the second embodiment above, channel $\lambda_3$' is then added to $\lambda_7$ by the separator 810C. This signal is looped back as an input to separator 810B, which adds $\lambda_7$ and $\lambda_3$' to $\lambda_1$ and $\lambda_5$. This combined signal is looped back as an input to separator 810A, which adds channels $\lambda_1$, $\lambda_5$,$\lambda_7$, $\lambda_3$' to channels $\lambda_2$, $\lambda_4$, $\lambda_6$, $\lambda_8$, resulting in one optical signal containing channels $\lambda_1$, $\lambda_3$', $\lambda_4$, $\lambda_5$, $\lambda_6$, $\lambda_7$, and $\lambda_8$. This new signal is then the output of the DWDM 800. Thus, in this manner, channel $\lambda_3$ is dropped while channel $\lambda_3$' is added. For this embodiment, for every three stages, one channel may be dropped from a group of eight channels. More generally, for $2^n$ channels and m stages, $2^{n-m}$ channels may be dropped.

Separators which may be used with the multi-stage parallel cascade configuration of the present invention are disclosed in co-pending U.S. Patent Applications "Fiber Optic Dense Wavelength Division Multiplexer with a Phase Differential Method of Wavelength Separation Utilizing a Polarization Beam Splitter and a Nonlinear Interferometer", Ser. No. 09/696,108, filed on Oct. 24, 2000, and in U.S. Pat. Nos. 6,130,971, 6,169,828, and 6,215,926 all assigned to the assignee of the present application. Applicant hereby incorporates these co-pending applications and U.S. Patents by reference.

Figure 9:
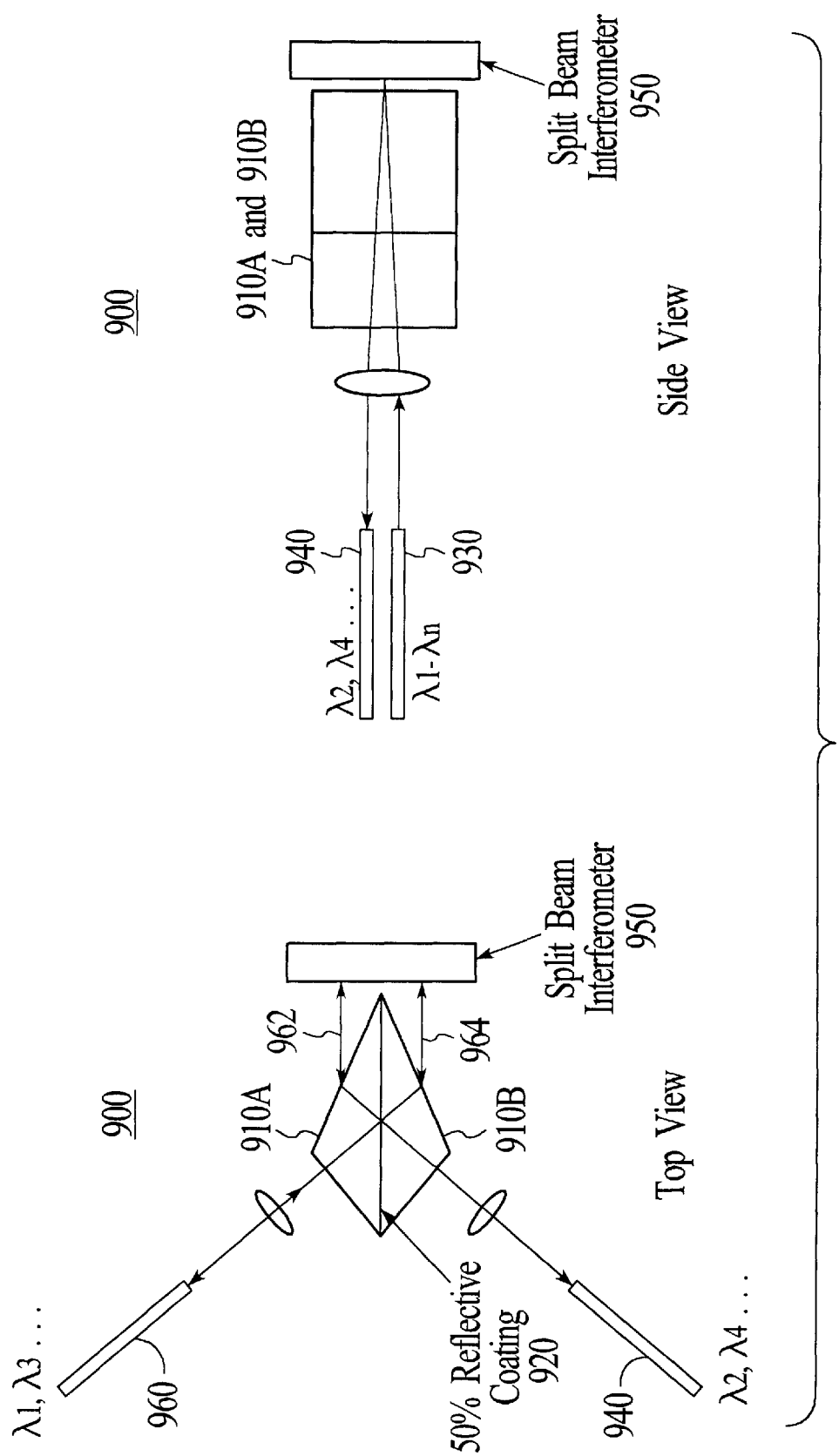
FIG. 9 is a block diagram of a first embodiment of a separator which may be used with the present invention.

FIG. 9 illustrates one embodiment of a separator which may be used with the present invention. This embodiment is disclosed in U.S. Pat. No. 6,215,926. The separator 900 comprises an input fiber 930 for inputting an optical signal, and two output fibers 940 and 960. It also comprises two blocks of glass 910A–910B, where the index of refraction for glass block 910A is greater than the index of refraction for glass block 910B, placed directly next to each other. Adjacent to one side of the blocks 910A and 910B is a nonlinear interferometer 950 which introduces a phase difference into the even channels while maintaining the same phase for the odd channels. At the place where the two blocks 910A–910B meet, the glass is coated with a reflective coating 920 with a reflectivity, for example, of 50%.

The reflective coating 920 splits the optical signal containing $\lambda 1$–$\lambda n$ into at least two portions 962, 964. According to the general operation of beam splitters, when light travels through glass block 910B and then is reflected from a surface of glass block 910A (which has a greater index of refraction than glass block 910B), the light undergoes a $\pi$ phase shift. This $\pi$ phase shift is indicated in FIG. 9 by the negative sign of the electric field (−E1) associated with signal 962 after it is reflected at the 50% reflective coating 920. Otherwise, the light does not undergo a phase shift, as is indicated by the positive sign of the electric field (E2) associated with signal 964 after it is transmitted through the 50% reflective coating 920 in FIG. 9. This reflection phase flip is very well known in the art and will not be further described here. In the preferred embodiment, the reflective coating 920 is polarization insensitive. The nonlinear interferometer 950 then introduces a $\pi$ phase difference into the even channels while maintaining the phase of the odd channels. The two output fibers 940 and 960 are then aligned, or placed at a particular distance from the separator 900, such that even channels are captured in phase in one fiber while the odd channels are captured in phase in the other. An example of a nonlinear interferometer which may be used with the separator 900 is disclosed in U.S. Pat. No. 6,169,604, assigned to the assignee of the present application. Applicant hereby incorporates this U.S. Patent by reference.

Figure 10:
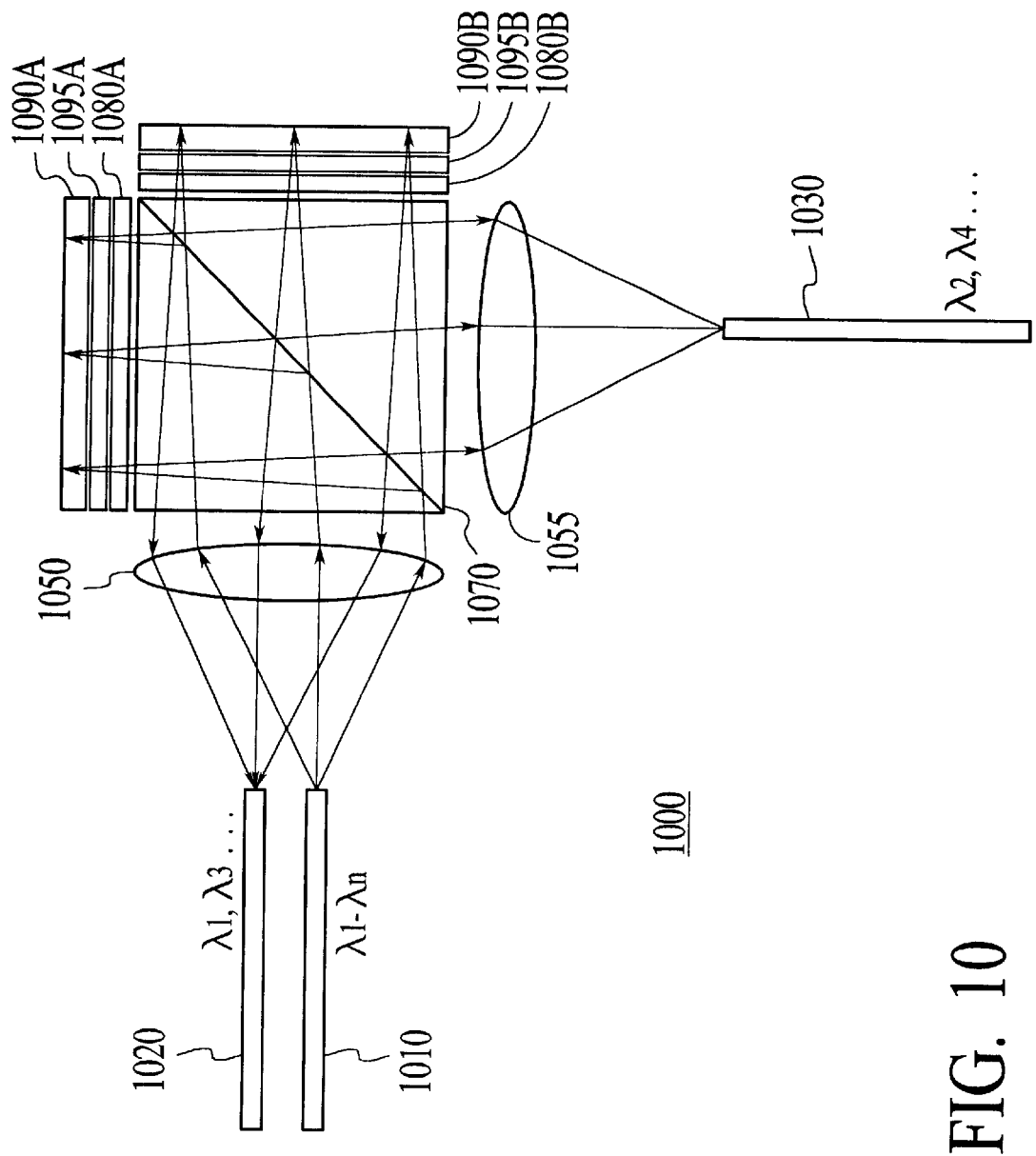
FIG. 10 is a block diagram of a second embodiment of separator which may be used with the present invention.

FIG. 10 is a simple block diagram of a second embodiment of a separator which may be used with the present invention. This embodiment is disclosed in U.S. Pat. Nos. 6,130,971 and 6,169,828, assigned the assignee of the present application. FIG. 10 shows a separator 1000 comprising an optic fiber 1010 for inputting an optical signal. The signal passes through a lens 1050. It travels into a polarization beam splitter 1070 which splits the signal based on its polarization. The portion of the signal parallel to a plane in the splitter 1070 (S signal) is reflected toward an interferometer 1050A. The portion of the signal perpendicular to the plane in the splitter 1070 (P signal) passes through toward an interferometer 1050B. The interferometers 1050A and 1050B introduce phase differences in the even channels but not the odd channels. An example of interferometer 1050A and 1050B are also disclosed in U.S. Pat. Nos. 6,169,604 and 6,130,971.

Figure 11:
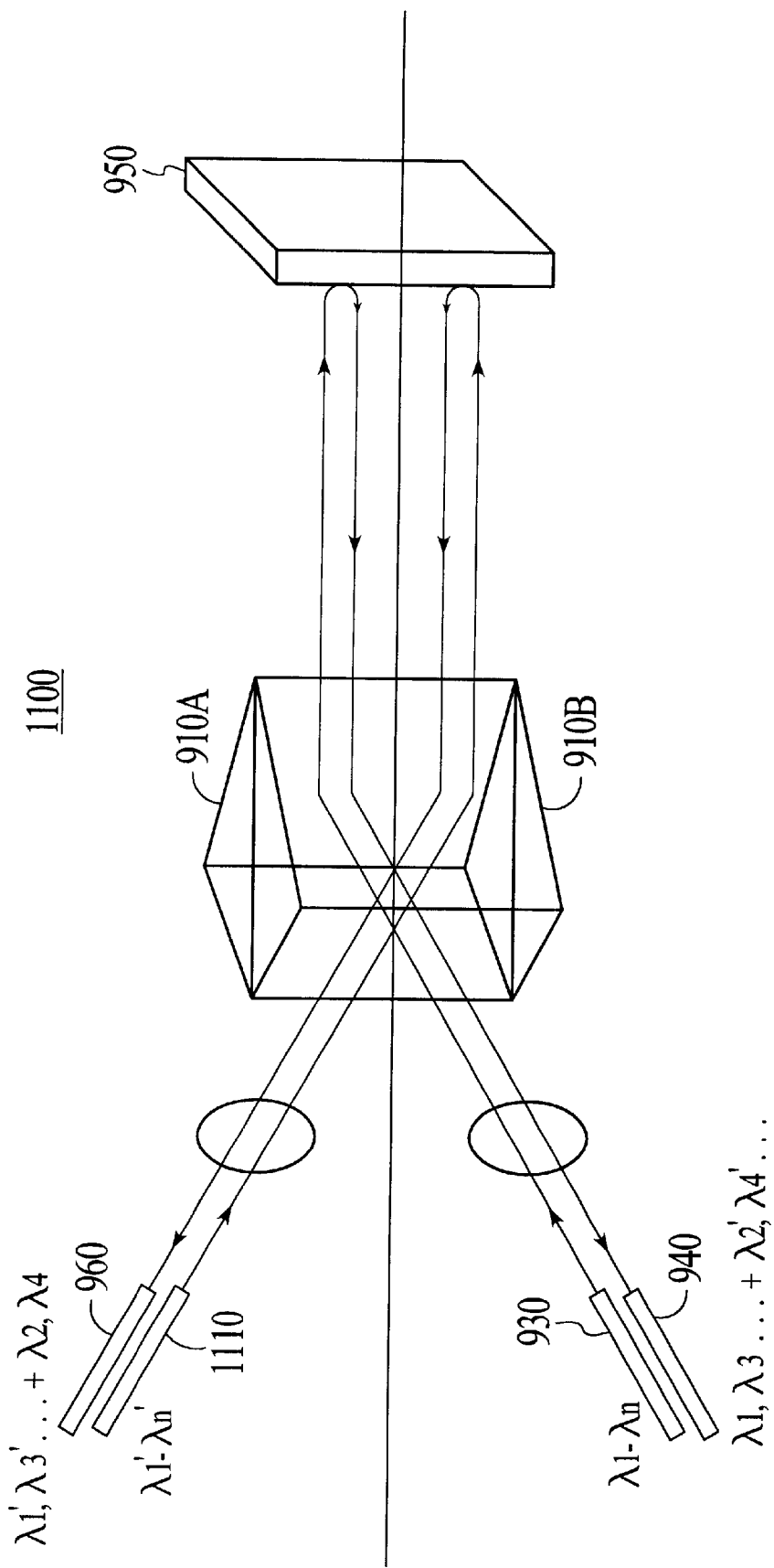
FIG. 11 is a block diagram of the first embodiment of a separator performing the add/drop function in accordance with the present invention.
Figure 12:
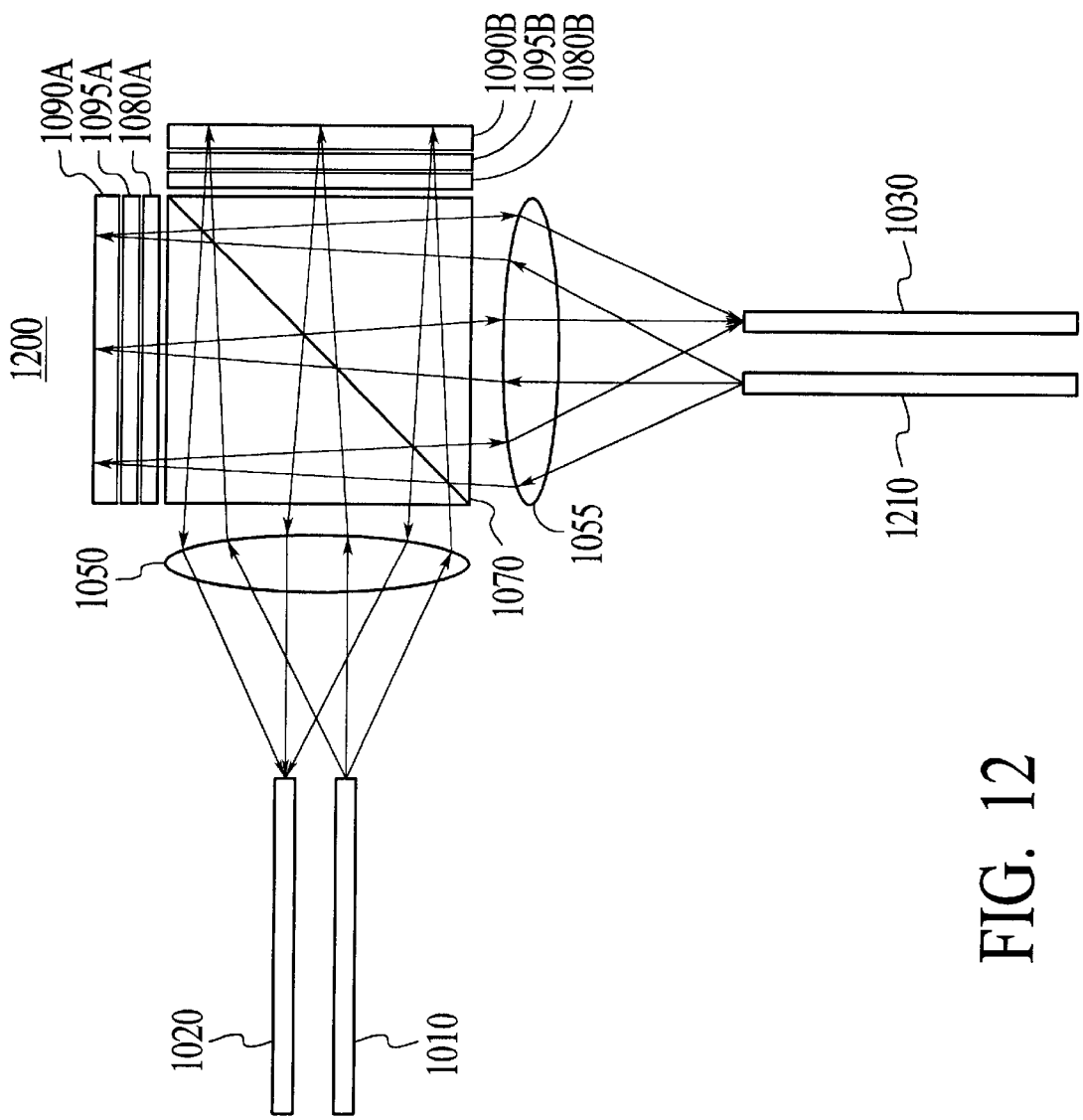
FIG. 12 is a block diagram of the second embodiment of a separator performing the add/drop function in accordance with the present invention.

FIGS. 11 and 12 illustrate the two embodiments of separators of FIGS. 9 and 10 respectively, performing the add/drop function as described in conjunction with the DWDM of FIGS. 7 and 8. In each embodiment illustrated in FIGS. 11 and 12, an additional input fiber (1110 of FIG. 11 and 1210 of FIG. 12) is added to input a second optical signal. These embodiments performing the add/drop function are also disclosed in their respective co-pending U.S. applications.

A dense wavelength division multiplexer with a multi-stage parallel cascade configuration of channel separators has been disclosed. This configuration provides for a lower insertion loss by requiring an optical signal to travel through fewer optical components.

Although the multistage parallel configuration of the present invention has been described with the specific embodiments of the separators, one of ordinary skill in the art will understand that other separators may be used with the configuration of the present invention without departing from the spirit and scope of the present invention.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for separating an optical signal into optical channels, the method comprising the steps of:

(a) inputting the optical signal, the optical signal comprising a plurality of optical channels;

(b) separating one or more of the plurality of optical channels into a first set of channels and a second set of channels interleaved with the first set of channels from the optical signal using a plurality of separators, wherein the separators are at least partly arranged in a multi-stage parallel cascade configuration; and (c) outputting the separated plurality of channels along a plurality of optical paths, wherein at least one of the plurality of separators outputs a first set of the plurality of optical channels to a first output, wherein at least one of the plurality of separators outputs a second set of the plurality of optical channels to a second output, wherein the first set of the plurality of optical channels is interleaved with the second set of the plurality of optical channels.

2. The method of claim 1, wherein the separators of the separating step (b) are arranged completely in a multi-stage parallel cascade configuration.

3. The method of claim 1, wherein the separators of the separating step (b) are arranged in a hybrid parallel-serial cascade configuration.

4. The method of claim 1, wherein the separators of the separating step (b) are arranged in a programmable router configuration.

5. The method of claim 1, wherein the separators of the separating step (b) are arranged in a programmable configuration performing the add/drop function.

6. The method of claim 1, wherein the optical signal in step (b) is separated into a set of odd optical channels and a set of even optical signals.

7. The method of claim 1, wherein the separator comprises:

(a) a first glass block coupled to a second glass block, wherein the first glass block is optically coupled to the inputted optical signal;

(b) at least one reflective coating residing between the first and second glass blocks; and (c) a split beam interferometer optically coupled to the first and second glass blocks, wherein the interferometer introduces a phase difference between at least two of the plurality of optical channels.

8. The method of claim 1, wherein the separator comprises:

(a) at least one lens optically coupled to the inputted optical signal;

(b) at least one lens optically coupled to the outputted plurality of optical channels;

(c) a polarization beam splitter optically coupled to the lenses; and (d) at least two reflection interferometers optically coupled to the polarization beam splitter, wherein the interferometers introduce a phase difference between at least two of the plurality of optical channels.

9. A system for separating an optical signal into optical channels, the system comprising:

means for inputting the optical signal, the optical signal comprising a plurality of optical channels;

a plurality of separators for separating one or more of the plurality of optical channels from the optical signal, wherein the separating means is at least partly arranged in a multi-stage parallel cascade configuration; and means for outputting the separated plurality of channels along a plurality of optical paths, wherein at least one of the plurality of separators outputs a first set of the plurality of optical channels to a first output, wherein at least one of the plurality of separators outputs a second set of the plurality of optical channels to a second output, wherein the first set of the plurality of optical channels is interleaved with the second set of the plurality of optical channels.

10. The system of claim 9, wherein the separators of the separating means are arranged completely in a multi-stage parallel cascade configuration.

11. The system of claim 9, wherein the separators of the separating means are arranged in a hybrid parallel-serial cascade configuration.

12. The system of claim 9, wherein the separators of the separating means are arranged in a programmable router configuration.

13. The system of claim 9, wherein the separators of the separating means are arranged in a programmable configuration performing the add/drop function.

14. The system of claim 9, wherein the optical signal in the separating means is separated into a set of odd optical channels and a set of even optical signals.

15. The system of claim 9, wherein the separating means comprises:

(a) a first glass block coupled to a second glass block, wherein the first glass block is optically coupled to the inputting means;

(b) at least one reflective coating residing between the first and second glass blocks; and (c) a split beam interferometer optically coupled to the first and second glass blocks, wherein the interferometer introduces a phase difference between at least two of the plurality of optical channels.

16. The system of claim 9, wherein the separating means comprises:

(a) at least one lens optically coupled to the inputting means;

(b) at least one lens optically coupled to the outputting means;

(c) a polarization beam splitter optically coupled to the lenses; and (d) at least two reflection interferometers optically coupled to the polarization beam splitter, wherein the interferometers introduce a phase difference between at least two of the plurality of optical channels.

17. The method of claim 2, wherein the multi-stage parallel cascade configuration comprises:

a plurality of cascades occurring in parallel, wherein each cascade comprises some of the plurality of separators arranged in at least one stage, wherein each separator derives from or acts upon a product of a preceding stage.

18. The method of claim 3, wherein the hybrid parallel-serial cascade configuration comprises:

a plurality of cascades occurring in parallel, wherein each cascade comprises some of the plurality of separators arranged in a plurality of stages, wherein a first stage of the plurality of stages of one of the plurality of cascades is arranged in a parallel cascade configuration, wherein each of the separators in the first stage derives from or acts upon a product of a preceding stage, wherein a second stage of the plurality of stages of the one of the plurality of cascades is arranged in a serial cascade configuration, wherein the second stage is optically coupled to the first stage, wherein the separators in the second stage are optically coupled in series.

19. The method of claim 4, wherein the programmable router configuration comprises:

the plurality of separators configured in either a multi-stage parallel cascade configuration or a hybrid parallel-serial cascade configuration, wherein at least one of the plurality of separators may be programmed such that a particular channel of the plurality of channels is routed to a particular optical path of the plurality of optical paths.

20. The method of claim 19, wherein the multi-stage parallel cascade configuration comprises:

a plurality of cascades occurring in parallel, wherein each cascade comprises some of the plurality of separators arranged in at least one stage, wherein each separator derives from or acts upon a product of a preceding stage.

21. The method of claim 19, wherein the hybrid parallel-serial cascade configuration comprises:

a plurality of cascades occurring in parallel, wherein each cascade comprises some of the plurality of separators arranged in a plurality of stages, wherein a first stage of the plurality of stages of one of the plurality of cascades is arranged in a parallel cascade configuration, wherein each of the separators in the first stage derives from or acts upon a product of a preceding stage, wherein a second stage of the plurality of stages of the one of the plurality of cascades is arranged in a serial cascade configuration, wherein the second stage is optically coupled to the first stage, wherein the separators in the second stage are optically coupled in series.

22. The method of claim 5, wherein the programmable configuration performing the add/drop function comprises:

a first separator, comprising:
a first input port of the first separator,
a second input port of the first separator,
a first output port of the first separator, and
a second output port of the first separator; and a second separator, comprising:
a first input port of the second separator optically coupled to the second output port of the first separator,
a second input port of the second separator,
a first output port of the second separator optically coupled to the second input port of the first separator, and
a second output port of the second separator.

23. The system of claim 10, wherein the multi-stage parallel cascade configuration comprises:

a plurality of cascades occurring in parallel, wherein each cascade comprises some the separators of the separating means arranged in at least one stage, wherein each separator derives from or acts upon a product of a preceding stage.

24. The system of claim 11, wherein the hybrid parallel-serial cascade configuration comprises:

a plurality of cascades occurring in parallel, wherein each cascade comprises some of the separators of the separating means arranged in a plurality of stages, wherein a first stage of the plurality of stages of one of the plurality of cascades is arranged in a parallel cascade configuration, wherein each of the separators in the first stage derives from or acts upon a product of a preceding stage, wherein a second stage of the plurality of stages of the one of the plurality of cascades is arranged in a serial cascade configuration, wherein the second stage is optically coupled to the first stage, wherein the separators in the second stage are optically coupled in series.

25. The system of claim 12, wherein the programmable router configuration comprises:

the separators of the separating means configured in either a multi-stage parallel cascade configuration or a hybrid parallel-serial cascade configuration, wherein at least one of the separators may be programmed such that a particular channel of the plurality of channels is routed to a particular optical path of the plurality of optical paths.

26. The system of claim 25, wherein the multi-stage parallel cascade configuration comprises:

a plurality of cascades occurring in parallel, wherein each cascade comprises some of the separators of the separating means arranged in at least one stage, wherein each separator derives from or acts upon a product of a preceding stage.

27. The system of claim 25, wherein the hybrid parallel-serial cascade configuration comprises:

a plurality of cascades occurring in parallel, wherein each cascade comprises some of the separators of the separating means arranged in a plurality of stages, wherein a first stage of the plurality of stages of one of the plurality of cascades is arranged in a parallel cascade configuration, wherein each of the separators in the first stage derives from or acts upon a product of a preceding stage, wherein a second stage of the plurality of stages of the one of the plurality of cascades is arranged in a serial cascade configuration, wherein the second stage is optically coupled to the first stage, wherein the separators in the second stage are optically coupled in series.

28. The system of claim 13, wherein the programmable configuration performing the add/drop function comprises:

a first separator, comprising:
a first input port of the first separator,
a second input port of the first separator,
a first output port of the first separator, and a second output port of the first separator; and a second separator, comprising:
- a first input port of the second separator optically coupled to the second output port of the first separator,
- a second input port of the second separator,
- a first output port of the second separator optically coupled to the second input port of the first separator, and
- a second output port of the second separator.

29. A method for separating an optical signal into optical channels, the method comprising the steps of:
   (a) inputting the optical signal, the optical signal comprising a plurality of optical channels;
   (b) separating one or more of the plurality of optical channels from the optical signal using a plurality of separators, wherein the separators are at least partly arranged in a multi-stage parallel cascade configuration, wherein at least one separator comprises:
      - a first glass block coupled to a second glass block, wherein the first glass block is optically coupled to the inputted optical signal,
      - at least one reflective coating residing between the first and second glass blocks, and
      - a split beam interferometer optically coupled to the first and second glass blocks, wherein the interferometer introduces a phase difference between at least two of the plurality of optical channels; and
   (c) outputting the separated plurality of channels along a plurality of optical paths.

30. A method for separating an optical signal into optical channels, the method comprising the steps of:
   (a) inputting the optical signal, the optical signal comprising a plurality of optical channels;
   (b) separating one or more of the plurality of optical channels from the optical signal using a plurality of separators, wherein the separators are at least partly arranged in a multi-stage parallel cascade configuration, wherein at least one separator comprises:
      - at least one lens optically coupled to the inputted optical signal,
      - at least one lens optically coupled to the outputted plurality of optical channels,
      - a polarization beam splitter optically coupled to the lenses, and
      - at least two reflection interferometers optically coupled to the polarization beam splitter, wherein the interferometers introduce a phase difference between at least two of the plurality of optical channels; and
   (c) outputting the separated plurality of channels along a plurality of optical paths.

31. A system for separating an optical signal into optical channels, the system comprising:
   means for inputting the optical signal, the optical signal comprising a plurality of optical channels;
   means for separating one or more of the plurality of optical channels from the optical signal, wherein the separating means is at least partly arranged in a multi-stage parallel cascade configuration, wherein the separating means comprises:
      - a first glass block coupled to a second glass block, wherein the first glass block is optically coupled to the inputting means,
      - at least one reflective coating residing between the first and second glass blocks, and
      - a split beam interferometer optically coupled to the first and second glass blocks, wherein the interferometer introduces a phase difference between at least two of the plurality of optical channels; and
   means for outputting the separated plurality of channels along a plurality of optical paths.

32. A system for separating an optical signal into optical channels, the system comprising:
   means for inputting the optical signal, the optical signal comprising a plurality of optical channels;
   means for separating one or more of the plurality of optical channels from the optical signal, wherein the separating means is at least partly arranged in a multi-stage parallel cascade configuration, wherein the separating means comprises:
      - at least one lens optically coupled to the inputting means,
      - at least one lens optically coupled to the outputting means,
      - a polarization beam splitter optically coupled to the lenses, and
      - at least two reflection interferometers optically coupled to the polarization beam splitter, wherein the interferometers introduce a phase difference between at least two of the plurality of optical channels; and
   means for outputting the separated plurality of channels along a plurality of optical paths.

33. A method for separating an optical signal into optical channels, the method comprising the steps of:
   (a) inputting the optical signal, the optical signal comprising a plurality of optical channels;
   (b) separating one or more of the plurality of optical channels from the optical signal using a plurality of separators, wherein at least one of the plurality of separators is configured as a 1×2 switch, wherein the separators are at least partly arranged in a multi-stage parallel cascade configuration, wherein the separators are arranged completely in a multi-stage parallel cascade configuration; and
   (c) outputting the separated plurality of channels along a plurality of optical paths.

34. The method of claim 33, wherein the multi-stage parallel cascade configuration comprises:
   a plurality of cascades occurring in parallel, wherein each cascade comprises some of the plurality of separators arranged in at least one stage, wherein each separator derives from or acts upon a product of a preceding stage.

35. A method for separating an optical signal into optical channels, the method comprising the steps of:
   (a) inputting the optical signal, the optical signal comprising a plurality of optical channels;
   (b) separating one or more of the plurality of optical channels from the optical signal using a plurality of separators, wherein at least one of the plurality of separators is configured as a 1×2 switch, wherein the separators are at least partly arranged in a multi-stage parallel cascade configuration, wherein the separators are arranged in a hybrid parallel-serial cascade configuration; and
   (c) outputting the separated plurality of channels along a plurality of optical paths.

36. The method of claim 35, wherein the hybrid parallel-serial cascade configuration comprises:
   a plurality of cascades occurring in parallel, wherein each cascade comprises some of the plurality of separators arranged in a plurality of stages, wherein a first stage of the plurality of stages of one of the plurality of cascades is arranged in a parallel cascade configuration, wherein each of the separators in the first stage derives from or acts upon a product of a preceding stage, wherein a second stage of the plurality of stages of the one of the plurality of cascades is arranged in a serial cascade configuration, wherein the second stage is optically coupled to the first stage, wherein the separators in the second stage are optically coupled in series.

37. A method for separating an optical signal into optical channels, the method comprising the steps of:

(a) inputting the optical signal, the optical signal comprising a plurality of optical channels;

(b) separating one or more of the plurality of optical channels from the optical signal using a plurality of separators, wherein at least one of the plurality of separators is configured as a 1×2 switch, wherein the separators are at least partly arranged in a multi-stage parallel cascade configuration, wherein the separators are arranged in a programmable router configuration; and (c) outputting the separated plurality of channels along a plurality of optical paths.

38. The method of claim 37, wherein the programmable router configuration comprises:

the plurality of separators configured in either a multi-stage parallel cascade configuration or a hybrid parallel-serial cascade configuration, wherein at least one of the plurality of separators may be programmed such that a particular channel of the plurality of channels is routed to a particular optical path of the plurality of optical paths.

39. The method of claim 38, wherein the multi-stage parallel cascade configuration comprises:

a plurality of cascades occurring in parallel, wherein each cascade comprises some of the plurality of separators arranged in at least one stage, wherein each separator derives from or acts upon a product of a preceding stage.

40. The method of claim 38, wherein the hybrid parallel-serial cascade configuration comprises:

a plurality of cascades occurring in parallel, wherein each cascade comprises some of the plurality of separators arranged in a plurality of stages, wherein a first stage of the plurality of stages of one of the plurality of cascades is arranged in a parallel cascade configuration, wherein each of the separators in the first stage derives from or acts upon a product of a preceding stage, wherein a second stage of the plurality of stages of the one of the plurality of cascades is arranged in a serial cascade configuration, wherein the second stage is optically coupled to the first stage, wherein the separators in the second stage are optically coupled in series.

41. A method for separating an optical signal into optical channels, the method comprising the steps of:

(a) inputting the optical signal, the optical signal comprising a plurality of optical channels;

(b) separating one or more of the plurality of optical channels from the optical signal using a plurality of separators, wherein at least one of the plurality of separators is configured as a 1×2 switch, wherein the separators are at least partly arranged in a multi-stage parallel cascade configuration, wherein the optical signal is separated into a set of odd optical channels and a set of even optical signals; and (c) outputting the separated plurality of channels along a plurality of optical paths.

42. A method for separating an optical signal into optical channels, the method comprising the steps of:

(a) inputting the optical signal, the optical signal comprising a plurality of optical channels;

(b) separating one or more of the plurality of optical channels from the optical signal using a plurality of separators, wherein at least one of the plurality of separators is configured as a 1×2 switch, wherein the separators are at least partly arranged in a multi-stage parallel cascade configuration, wherein at least one of the separators comprises:

a first glass block coupled to a second glass block, wherein the first glass block is optically coupled to the inputted optical signal, at least one reflective coating residing between the first and second glass blocks, and a split beam interferometer optically coupled to the first and second glass blocks, wherein the interferometer introduces a phase difference between at least two of the plurality of optical channels; and (c) outputting the separated plurality of channels along a plurality of optical paths.

43. A method for separating an optical signal into optical channels, the method comprising the steps of:

(a) inputting the optical signal, the optical signal comprising a plurality of optical channels;

(b) separating one or more of the plurality of optical channels from the optical signal using a plurality of separators, wherein at least one of the plurality of separators is configured as a 1×2 switch, wherein the separators are at least partly arranged in a multi-stage parallel cascade configuration, wherein at least one of the separators comprises:

at least one lens optically coupled to the inputted optical signal, at least one lens optically coupled to the outputted plurality of optical channels, a polarization beam splitter optically coupled to the lenses, and at least two reflection interferometers optically coupled to the polarization beam splitter, wherein the interferometers introduce a phase difference between at least two of the plurality of optical channels; and (c) outputting the separated plurality of channels along a plurality of optical paths.

44. A system for separating an optical signal into optical channels, the system comprising:

means for inputting the optical signal, the optical signal comprising a plurality of optical channels;

means for separating one or more of the plurality of optical channels from the optical signal, wherein the separating means comprises at least one 1×2 switch, wherein separators of the separating means are arranged completely in a multi-stage parallel cascade configuration; and means for outputting the separated plurality of channels along a plurality of optical paths.

45. The system of claim 44, wherein the multi-stage parallel cascade configuration comprises:

a plurality of cascades occurring in parallel, wherein each cascade comprises some the separators of the separating means arranged in at least one stage, wherein each separator derives from or acts upon a product of a preceding stage.

46. A system for separating an optical signal into optical channels, the system comprising:
- means for inputting the optical signal, the optical signal comprising a plurality of optical channels;
- means for separating one or more of the plurality of optical channels from the optical signal, wherein the separating means is at least partly arranged in a multi-stage parallel cascade configuration, wherein the separating means comprises at least one 1×2 switch, wherein separators of the separating means are arranged in a hybrid parallel-serial cascade configuration; and
- means for outputting the separated plurality of channels along a plurality of optical paths.

47. The system of claim 46, wherein the hybrid parallel-serial cascade configuration comprises:
- a plurality of cascades occurring in parallel, wherein each cascade comprises some of the separators of the separating means arranged in a plurality of stages,
- wherein a first stage of the plurality of stages of one of the plurality of cascades is arranged in a parallel cascade configuration, wherein each of the separators in the first stage derives from or acts upon a product of a preceding stage,
- wherein a second stage of the plurality of stages of the one of the plurality of cascades is arranged in a serial cascade configuration, wherein the second stage is optically coupled to the first stage, wherein the separators in the second stage are optically coupled in series.

48. A system for separating an optical signal into optical channels, the system comprising:
- means for inputting the optical signal, the optical signal comprising a plurality of optical channels;
- means for separating one or more of the plurality of optical channels from the optical signal, wherein the separating means is at least partly arranged in a multi-stage parallel cascade configuration, wherein the separating means comprises at least one 1×2 switch, wherein separators of the separating means are arranged in a programmable router configuration; and
- means for outputting the separated plurality of channels along a plurality of optical paths.

49. The system of claim 48, wherein the programmable router configuration comprises:
- the separators of the separating means configured in either a multi-stage parallel cascade configuration or a hybrid parallel-serial cascade configuration, wherein at least one of the separators may be programmed such that a particular channel of the plurality of channels is routed to a particular optical path of the plurality of optical paths.

50. The system of claim 49, wherein the multi-stage parallel cascade configuration comprises:
- a plurality of cascades occurring in parallel, wherein each cascade comprises some of the separators of the separating means arranged in at least one stage, wherein each separator derives from or acts upon a product of a preceding stage.

51. The system of claim 49, wherein the hybrid parallel-serial cascade configuration comprises:
- a plurality of cascades occurring in parallel, wherein each cascade comprises some of the separators of the separating means arranged in a plurality of stages,
- wherein a first stage of the plurality of stages of one of the plurality of cascades is arranged in a parallel cascade configuration, wherein each of the separators in the first stage derives from or acts upon a product of a preceding stage,
- wherein a second stage of the plurality of stages of the one of the plurality of cascades is arranged in a serial cascade configuration, wherein the second stage is optically coupled to the first stage, wherein the separators in the second stage are optically coupled in series.

52. A system for separating an optical signal into optical channels, the system comprising:
- means for inputting the optical signal, the optical signal comprising a plurality of optical channels;
- means for separating one or more of the plurality of optical channels from the optical signal, wherein the separating means is at least partly arranged in a multi-stage parallel cascade configuration, wherein the separating means comprises at least one 1×2 switch, wherein the optical signal in the separating means is separated into a set of odd optical channels and a set of even optical signals; and
- means for outputting the separated plurality of channels along a plurality of optical paths.

53. A system for separating an optical signal into optical channels, the system comprising:
- means for inputting the optical signal, the optical signal comprising a plurality of optical channels;
- means for separating one or more of the plurality of optical channels from the optical signal, wherein the separating means is at least partly arranged in a multi-stage parallel cascade configuration, wherein the separating means comprises at least one 1×2 switch, wherein the separating means comprises:
  - a first glass block coupled to a second glass block, wherein the first glass block is optically coupled to the inputting means,
  - at least one reflective coating residing between the first and second glass blocks, and
  - a split beam interferometer optically coupled to the first and second glass blocks, wherein the interferometer introduces a phase difference between at least two of the plurality of optical channels; and
- means for outputting the separated plurality of channels along a plurality of optical paths.

54. A system for separating an optical signal into optical channels, the system comprising:
- means for inputting the optical signal, the optical signal comprising a plurality of optical channels;
- means for separating one or more of the plurality of optical channels from the optical signal, wherein the separating means is at least partly arranged in a multi-stage parallel cascade configuration, wherein the separating means comprises at least one 1×2 switch, wherein the separating means comprises:
  - at least one lens optically coupled to the inputting means,
  - at least one lens optically coupled to the outputting means,
  - a polarization beam splitter optically coupled to the lenses, and
  - at least two reflection interferometers optically coupled to the polarization beam splitter, wherein the interferometers introduce a phase difference between at least two of the plurality of optical channels; and
- means for outputting the separated plurality of channels along a plurality of optical paths.

* * * * *